(12) United States Patent
Putzolu et al.

(10) Patent No.: US 9,916,031 B2
(45) Date of Patent: Mar. 13, 2018

(54) MECHANISM TO AVOID UNINTENTIONAL USER INTERACTION WITH A CONVERTIBLE MOBILE DEVICE DURING CONVERSION

(71) Applicant: Intel Corporation, Santa Clara, CA (US)

(72) Inventors: David M. Putzolu, Hillsboro, CA (US); Brian E. Woodruff, Tigard, OR (US); Cheng Feng, Shanghai (CN); Kevin S. Rhodes, Beaverton, OR (US); Xiang Zhou, Shanghai (CN); Kevy S. Zhang, Shanghai (CN); Pronay Dutta, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 113 days.

(21) Appl. No.: 15/035,338

(22) PCT Filed: Dec. 26, 2013

(86) PCT No.: PCT/CN2013/090531
§ 371 (c)(1),
(2) Date: May 9, 2016

(87) PCT Pub. No.: WO2015/096084
PCT Pub. Date: Jul. 2, 2015

(65) Prior Publication Data
US 2016/0274722 A1 Sep. 22, 2016

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1616* (2013.01); *G06F 1/1618* (2013.01);
(Continued)

(58) Field of Classification Search
CPC ........ G06F 3/023; G06F 3/038; G06F 3/0416; G06F 3/03547; G06F 3/0354; G06F 3/041
See application file for complete search history.

(56) References Cited

U.S. PATENT DOCUMENTS 7,787,245 B2 * 8/2010 Prabhune ................ G06F 1/162
361/679.27
8,136,402 B2 * 3/2012 Cato ......................... G01P 5/08
73/514.16

(Continued)

FOREIGN PATENT DOCUMENTS

CN      1797286        7/2006
CN      1854983 A      11/2006

(Continued)

OTHER PUBLICATIONS

English Translation of First Office Action in Japanese Application No. 2016-541490 dated Apr. 25, 2017, 4 pages.

(Continued)

*Primary Examiner* — Vijay Shankar
(74) *Attorney, Agent, or Firm* — Womble Bond Dickinson (US) LLP

(57) ABSTRACT

According to one embodiment, a device includes control logic, at least a portion of which is implemented in hardware, to process motion data, the motion data collected from a first accelerometer in a base unit and from a second accelerometer in a display panel attached to a base unit of a mobile device, to determine whether the display panel moves relative to the base unit and to temporarily ignore or (Continued)

disable one or more input devices of the mobile device for a predetermined period of time to avoid unintentional user interaction with the mobile device during the movement of the display panel.

21 Claims, 8 Drawing Sheets

(51) Int. Cl.
G06F 3/023 (2006.01)
G06F 3/038 (2013.01)
G06F 3/0354 (2013.01)
H04M 1/02 (2006.01)

(52) U.S. Cl.
CPC ............ *G06F 1/1694* (2013.01); *G06F 3/023* (2013.01); *G06F 3/038* (2013.01); *G06F 3/03547* (2013.01); *H04M 1/0241* (2013.01); *H04M 2250/12* (2013.01)

(56) References Cited

U.S. PATENT DOCUMENTS

| 8,635,910 | B2* | 1/2014 | Cato | G01P 5/08 |
| | | | | 345/173 |
| 8,798,669 | B2* | 8/2014 | Russ | H04M 1/0256 |
| | | | | 345/173 |
| 9,164,614 | B2* | 10/2015 | Irie | G06F 1/1675 |
| 9,223,344 | B2* | 12/2015 | Wang | G06F 1/1632 |
| 2006/0045495 | A1 | 3/2006 | Prabhune et al. | |
| 2010/0305899 | A1* | 12/2010 | Czompo | G01C 21/16 |
| | | | | 702/152 |
| 2012/0319943 | A1* | 12/2012 | Tamura | G06F 1/1647 |
| | | | | 345/156 |
| 2013/0235083 | A1* | 9/2013 | Bao | G06F 3/1423 |
| | | | | 345/649 |
| 2013/0321339 | A1* | 12/2013 | Irie | G06F 1/1675 |
| | | | | 345/174 |

FOREIGN PATENT DOCUMENTS

| CN | 102662436 A | 9/2012 |
| CN | 103176529 A | 6/2013 |
| CN | 103369144 | 10/2013 |
| JP | 2004-220253 | 8/2004 |
| JP | 2005277775 | 10/2005 |
| JP | 2008-250835 | 10/2008 |
| JP | 2011204129 | 10/2011 |
| JP | 2012168618 | 9/2012 |
| KR | 10-2011-0053265 | 5/2011 |

OTHER PUBLICATIONS

International Preliminary Report on Patentability for PCT Application No. PCT/CN2013/090531 dated Jul. 7, 2017, 5 pages.
PCT/CN2013/090531, International Preliminary Report on Patentability, dated Jul. 7, 2016, 6 pages.
English Translation First Preliminary Rejection in Korean Application No. 2016-7013958 dated Apr. 17, 2017, 5 pages.
PCT/CN2013/090531, International Search Report and Written Opinion, dated Sep. 29, 2014, 18 pages.

* cited by examiner

| Function | Clamshell Closed | Clamshell Open | Tent Mode | Tablet Mode | Stand Mode |
|---|---|---|---|---|---|
| Keyboard button press is a wake source | No | Yes | No | No | No |
| Lid closed/opened is a power state indication | Notify OS so that it may enter CS, S3, or other power state, if configured to do so | Notify OS so that it may enter S0, if configured to do so | No | No | No |
| Keyboard backlight is on | No | Yes | No | No | No |
| Keyboard adaptive brightness active | No | Yes | No | No | No |
| Screen bezel area grows thicker to allow tablet use | No | No | Yes | Yes | Yes |
| Screen should auto-rotate based on device orientation | No | No | Yes (but will only report inverted landscape) | Yes (all four screen orientations) | Yes (but will only likely report landscape) |

FIG. 6

MECHANISM TO AVOID UNINTENTIONAL USER INTERACTION WITH A CONVERTIBLE MOBILE DEVICE DURING CONVERSION

CROSS-REFERENCE TO RELATED APPLICATIONS

This patent application is a U.S. National Phase Application under 35 U.S.C. § 371 of International Application No. PCT/CN2013/090531, filed Dec. 26, 2013, entitled "MECHANISM TO AVOID UNINTENTIONAL USER INTERACTION WITH A CONVERTIBLE MOBILE DEVICE DURING CONVERSION."

TECHNICAL FIELD

Embodiments of the present invention relate generally to electronic mobile devices. More particularly, embodiments of the invention relate to preventing unintentional user interaction with a mobile device during a transition of operating modes of the mobile device.

BACKGROUND ART

Mobile devices, including cellular phones, smart phones, mobile Internet devices (MIDs), handheld computers, personal digital assistants (PDAs), and other similar devices, provide a wide variety of applications for various purposes, including business and personal use.

A mobile device requires one or more input mechanisms to allow a user to input instructions and responses for such applications. As mobile devices become smaller yet more full-featured, a reduced number of user input devices (such as switches, buttons, trackballs, dials, touch sensors, and touch screens) are used to perform an increasing number of application functions.

Ultrabook convertibles, also called "Two-in-Ones," have the ability to operate in a clamshell (traditional laptop) mode 101 and a tablet mode 102 as shown in FIG. 1. Some ultrabook convertibles can also operate in a tent mode 103 and a stand mode 104 as shown in FIG. 1. A clamshell mode can be either a clamshell close mode in which the screen is facing the keyboard and the two are parallel, or clamshell open mode in which the screen is facing the user in landscape orientation and is less than 180° open from the clamshell closed state. A tent mode refers to a configuration in which the screen is facing the user in landscape or inverted landscape orientation and is more than 180° open from the clamshell closed state, but is not fully in the tablet (360°) state. A tablet mode refers to a configuration in which the screen is facing the user in landscape, portrait, inverted landscape, or inverted portrait orientation. The keyboard is facing in the opposite direction from the screen and the two are parallel. A stand mode refers to a configuration in which the screen is facing the user in landscape mode, with the keyboard sitting flat on the table. The screen is articulated between 270 and 360 degrees versus the keyboard.

Converting between modes requires flipping or twisting the screen or display panel so that it folds down on top of or behind the keyboard as part of the base unit. While doing this, it is possible for a user to unintentionally touch parts of the system that cause side effects. For example, the user might mistakenly touch the touch screen, changing the input focus of the cursor, or they might press a key on the keyboard they did not wish to press. Other parts of the system that may be touched unintentionally include the touchpad, touchpad buttons, or system buttons such as volume up, volume down, mute, screen rotation lock, or power button. Having the system react unexpectedly (e.g. shut off because the user unintentionally touched the power button while converting between clamshell and tablet mode) is a poor user experience.

BRIEF DESCRIPTION OF THE DRAWINGS

Embodiments of the invention are illustrated by way of example and not limitation in the figures of the accompanying drawings in which like references indicate similar elements.

FIG. 6 is a block diagram illustrating certain operating modes of a mobile device according to one embodiment.

DESCRIPTION OF THE EMBODIMENTS

Figure 1:
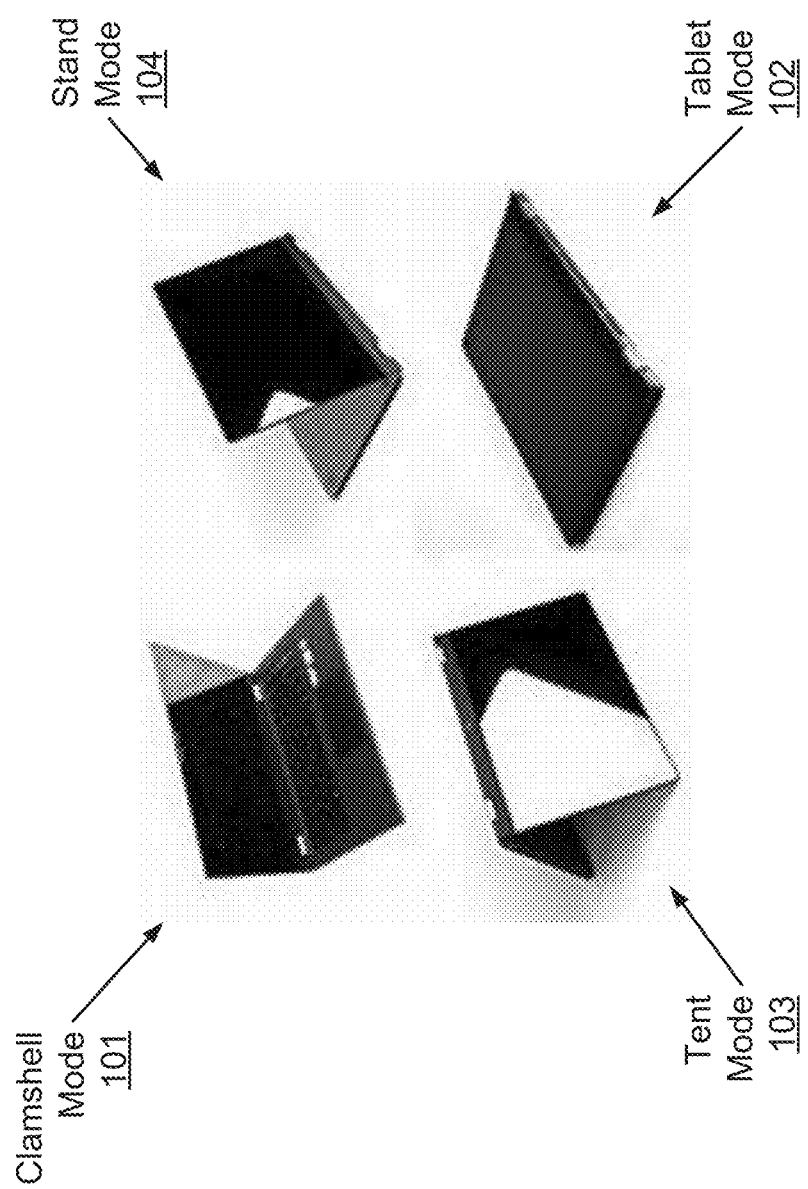
FIG. 1 shows certain operating modes of a convertible mobile device.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are generally directed to touch sensor gesture recognition for operation of mobile devices. As used herein:

"Mobile device" means a mobile electronic device or system including a cellular phone, smart phone, mobile Internet device (MID), handheld computers, personal digital assistants (PDAs), and other similar devices.

"Touch sensor" means a sensor that is configured to provide input signals that are generated by the physical touch of a user, including a sensor that detects contact by a thumb or other finger of a user of a device or system.

In some embodiments, a mobile device includes a touch sensor for the input of signals. In some embodiments, the touch sensor includes a plurality of sensor elements. In some embodiments, a method, apparatus, or system provides for:

(1) A zoned touch sensor for multiple, simultaneous user interface modes; (2) Selection of a gesture identification algorithm based on an application; and (3) Neural network optical calibration of a touch sensor.

In some embodiments, a mobile device includes an instrumented surface designed for manipulation via a finger of a mobile user. In some embodiments, the mobile device includes a sensor on a side of a device that may especially be accessible by a thumb (or other finger) of a mobile device user. In some embodiments, the surface of a sensor may be designed in any shape. In some embodiments, the sensor is constructed as an oblong intersection of a saddle shape. In some embodiments, the touch sensor is relatively small in comparison with the thumb used to engage the touch sensor.

In some embodiments, instrumentation for a sensor is accomplished via the use of capacitance sensors and/or optical or other types of sensors embedded beneath the surface of the device input element. In some embodiments, these sensors are arranged in one of a number of possible patterns in order to increase overall sensitivity and signal accuracy, but may also be arranged to increase sensitivity to different operations or features (including, for example, motion at an edge of the sensor area, small motions, or particular gestures). Many different sensor arrangements for a capacitive sensor are possible, including, but not limited to, the sensor arrangements.

In some embodiments, sensors include a controlling integrated circuit that is interfaced with the sensor and designed to connect to a computer processor, such as a general-purpose processor, via a bus, such as a standard interface bus. In some embodiments, sub-processors are variously connected to a computer processor responsible for collecting sensor input data, where the computer processor may be a primary CPU or a secondary microcontroller, depending on the application. In some embodiments, sensor data may pass through multiple sub-processors before the data reaches the processor that is responsible for handling all sensor inputs.

According to some embodiments, a mobile device or mobile system such as a convertible ultrabook includes a sensor logic (also referred to as a sensor controller, sensor control logic, sensor microcontroller, or simply control logic), which connects to and controls the two accelerometers disposed in the lid or display panel and the base unit of the mobile device, monitors the relative angle of the lid and the base unit. When the angle between the lid and the base unit begins to change, the sensor logic raises a signal to indicate that a conversion (e.g., clamshell to slate or vice versa) is occurring. An embedded controller (EC) or control logic along with other controllers (touch controller, touchpad controller) receives this signal and temporarily disables their functions or ignore the input signals received from the corresponding sensors or keyboard for the duration of the conversion period. By doing this, it is possible to reduce the occurrence of unintentional user input during the conversion process.

According to another embodiment, in addition to using two accelerometers, a mobile device further includes one or more magnetometers, in combination of the accelerometers, to determine an operating mode in which the mobile device is operating. In one embodiment, when the lid and base are coplanar in either tablet mode or clamshell closed mode, a magnetometer provides confirmation of the lid state. The accelerometers can measure the angle of a surface with respect to gravity in three dimensions. An Ultrabook with two accelerometers can use the difference in angle with respect to gravity between the lid and the base to calculate the angle between the two surfaces. A magnetometer in one surface placed opposite a magnet on the opposing surface may be used to sense the orientation of that surface. For example, when the lid is closed, the magnetic field may be strongly positive, and when the lid is open, the magnetic field may be strongly negative. The magnetic field strength observed on one or more axes may be strongly positive or negative. The information from the accelerometers and magnetometer may be combined with other physical or fusion sensors in the sensor solution to calculate an accurate representation of the platform's position in space and position of its surfaces. Based on the information representing the operating modes, an operating system (OS) can reconfigure or make adjustment to an operating environment that is more suitable to the detected operating mode.

Figure 2:
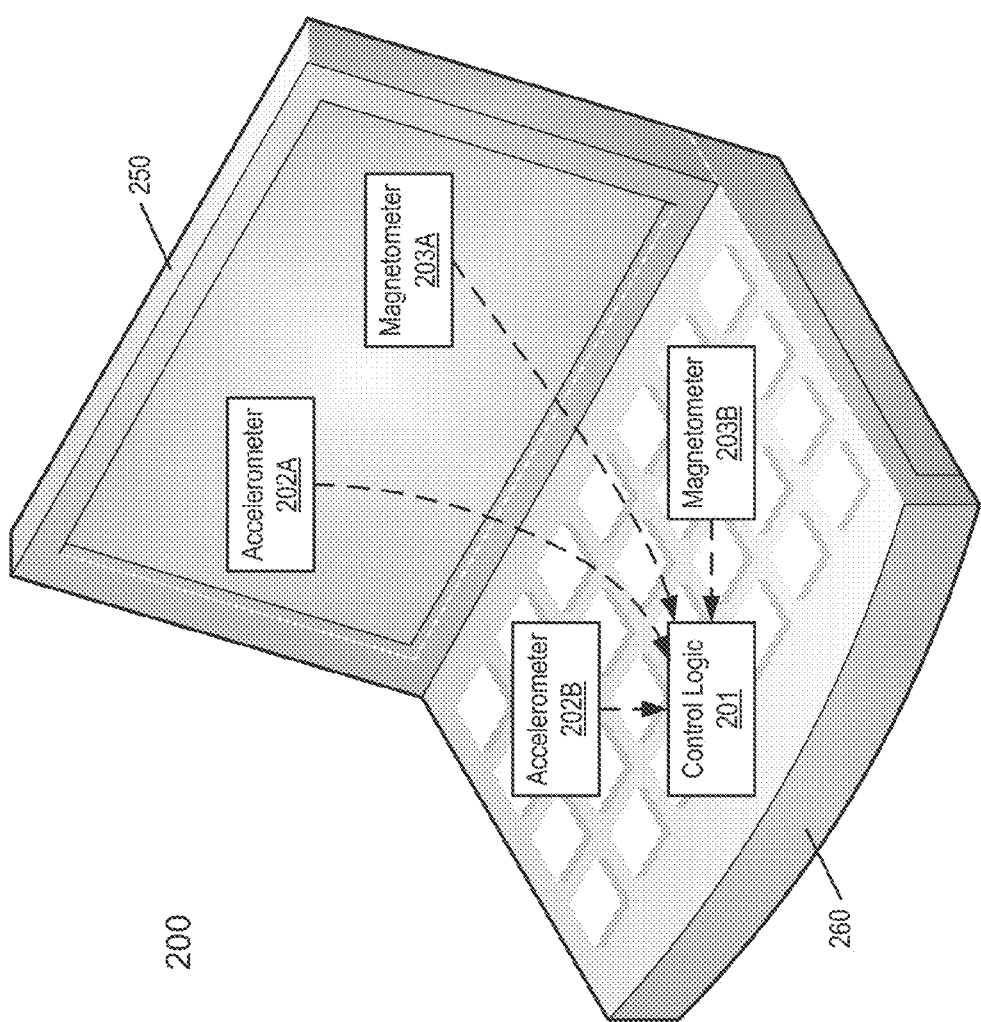
FIG. 2 is a block diagram illustrating a mobile device according to one embodiment.

FIG. 2 is a block diagram illustrating a mobile device according to one embodiment. Referring to FIG. 2, mobile device 200 includes one or more accelerometers 202A and 202B disposed on lid having a display screen on one surface (also referred to as a display panel) 250 and base unit (or simply base) 260, respectively. Control logic 201 (e.g., such as a microcontroller such as sensor logic) is coupled to accelerometers 202A-202B to process movement data captured by accelerometers 202A-202B to determine an angle between lid 250 relative to base unit 260. Control logic 201 may include a hardware controller that can perform a number of functions, such as those set forth below. Throughout this application, a controller is utilized as an example of control logic, which may be implemented as hardware, software, or a combination thereof. Based on the change of angle between lid 250 and base 260, sensor logic 201 can determine whether lid 250 is moving (e.g., close, open, flip, twist, rotate, or a combination thereof) relative to base 260. If so, according to one embodiment, sensor logic can temporarily disable other controllers that control other input devices or circuits, such as a touch screen, a touch pad, and keyboard, to receive user input, or cause such input devices or circuit to ignore any user interaction with the input devices, for a predetermined period of time in which most users would have complete the transition of different modes of the mobile device. In one embodiment, the predetermined period of time may be ranging from approximately 1 to 3 seconds, which may be user or administrator configurable and stored in a persistent storage area of the mobile device. As a result, the unintentional user interaction with the input devices or circuits can be avoided.

According to another embodiment, mobile device 200 further includes one or more magnetometers 203A-203B disposed within lid 250 and base 260, respectively. Based on the magnetic data collected from magnetometers 203A-203B, sensor logic 201 can calculates or determine the orientation of lid 250 relatively to base 260. Based on the orientation of lid 250 relatively to base 260, sensor logic 201 can determine which of the operating modes (e.g., clamshell mode, tablet mode, tent mode, and stand mode as shown in FIG. 1) in which mobile device 200 is operating. Sensor logic 201 can communicate this information to other software such as an operating system to allow the operating system to adjust an operating environment of the mobile device 200 that is most appropriate for that particular operating mode.

Figure 3:
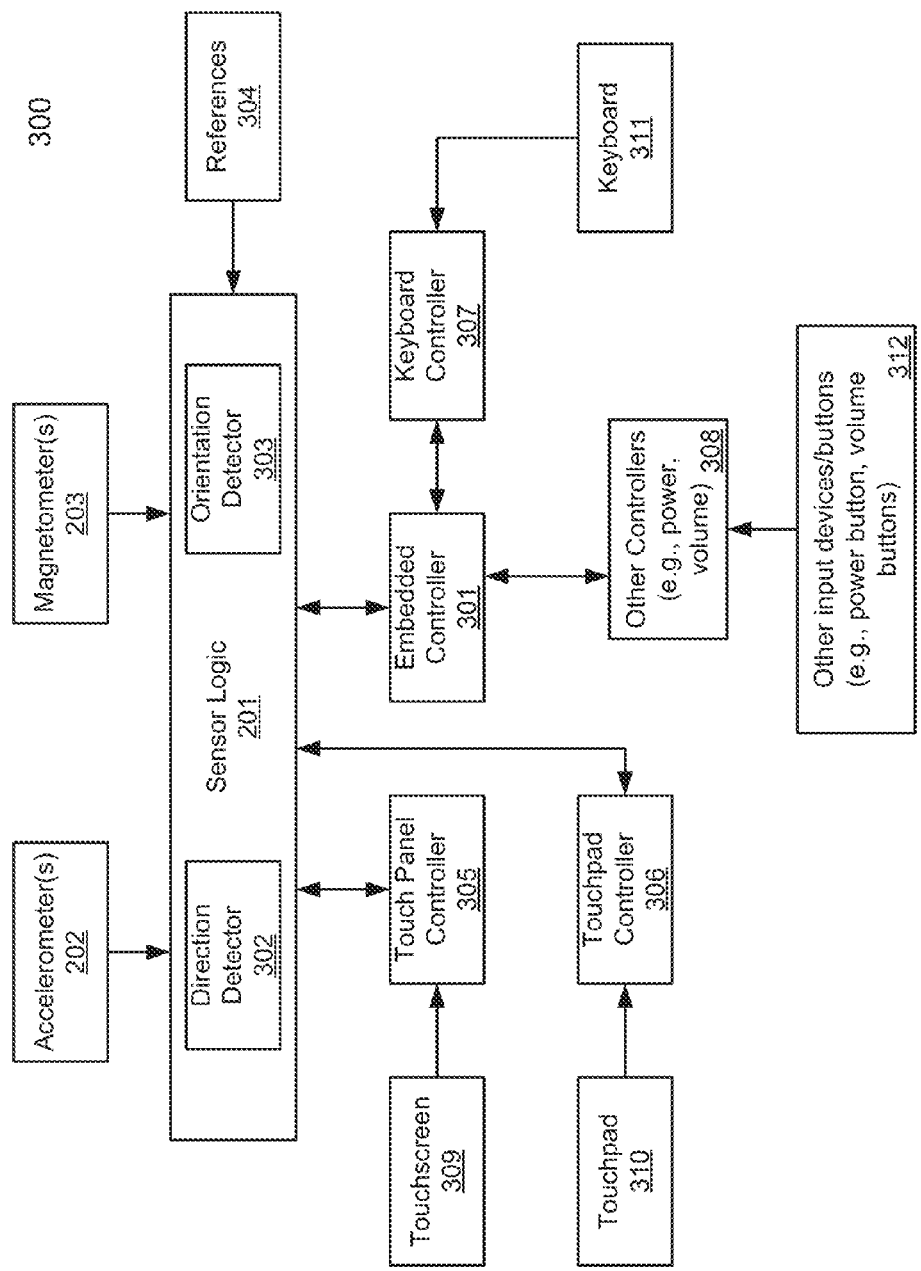
FIG. 3 is a block diagram illustrating architecture of a mobile device according to one embodiment.

FIG. 3 is a block diagram illustrating architecture of a mobile device according to one embodiment. Mobile device 300 may be implemented as part of device 200 of FIG. 2. Referring to FIG. 3, mobile device 300 includes sensor logic 201 coupled to one or more accelerometers 202 and one or more magnetometers 203 to receive and process movement data and magnetic data, respectively. Accelerometers 202 may be disposed on the lid and the base unit of the mobile device. In one embodiment, based on movement data (e.g., a change of angle between the lid and the base) collected by accelerometers 202, direction detector 302 is configured to determine, in view reference signals 304, whether the lid (display panel) is moving relative to the base unit and/or a movement direction. If it is determined that the lid is moving relative to the base, sensor logic 201 is configured to notify by sending a signal to embedded controller 301. Embedded controller 301 in turn disables or causes other controller to ignore the associated user input devices or circuits, in order to avoid any unintentional user interaction with the user input devices.

In one embodiment, embedded controller 301 may disable touch screen controller 305 or cause touch screen controller 305 to ignore any user interaction with the associated touch screen 309. Embedded controller 301 may disable touchpad controller 306 or cause touchpad controller 306 to ignore any user interaction with the associated touchpad 310. Embedded controller 301 may disable keyboard controller 307 or cause keyboard controller 307 to ignore any user interaction with the associated keyboard 311. Similarly, embedded controller 301 may disable or ignore other input devices, such as, for example, system buttons (e.g., volume button, mute button, screen rotation lock button, and power button).

Figure 4:
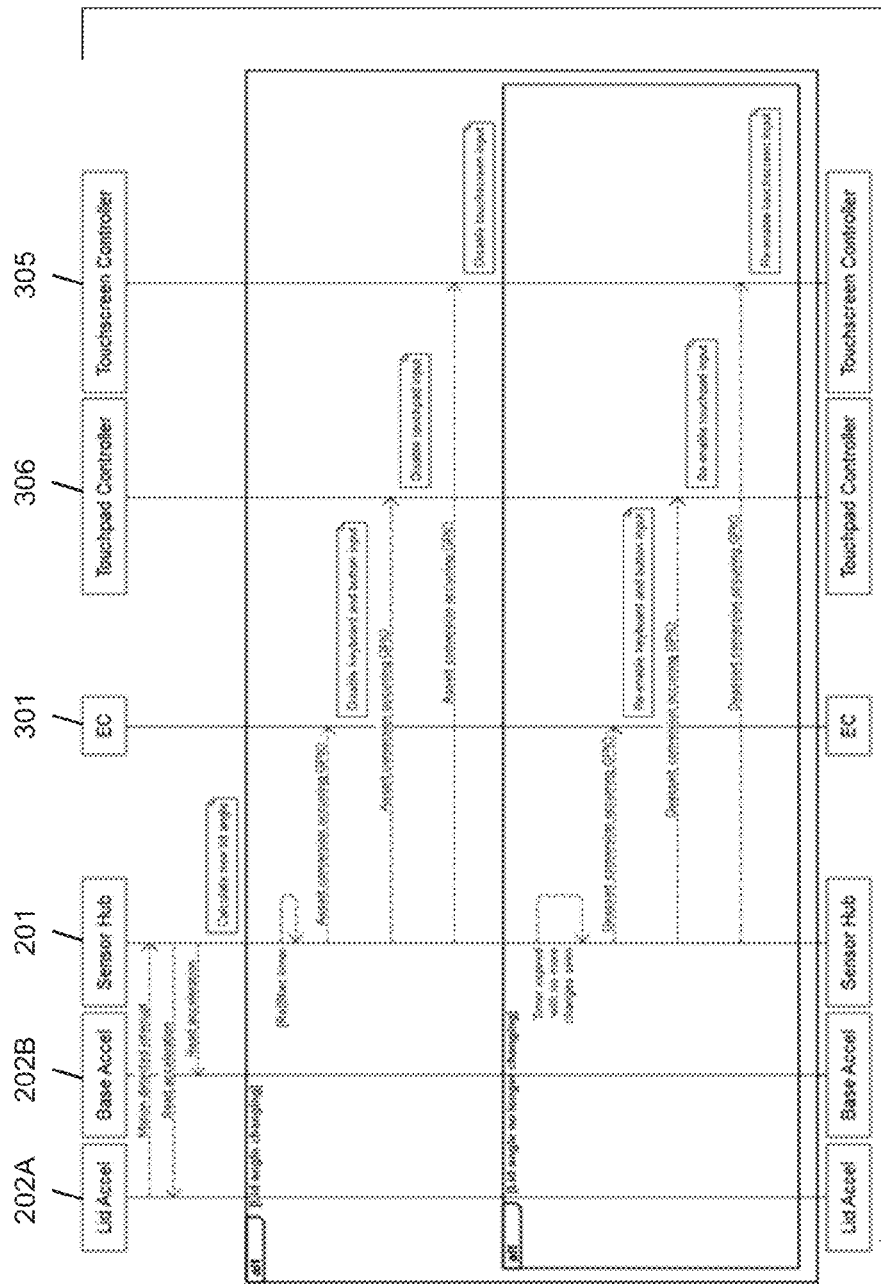
FIG. 4 is a timeline diagram illustrating certain transactions amongst different components according to one embodiment of the invention.

According to one embodiment, detecting change to a lid angle is performed by storing the current lid angle in the sensor logic 201 and configuring both the base and the lid accelerometers to generate interrupts if the measured acceleration changes as shown in FIG. 4. Referring to FIG. 4, when this interrupt occurs, the sensor logic 201 reads the current value of both accelerometers 202A-202B, which will both point to gravity, plus some additional acceleration from the user's manipulation of the platform. The sensor logic 201 uses the two accelerometer values to compute the angle between the lid and the base and compares the new angle value to the previous angle reading. If the reading is different this indicates that the angle between the lid and the base is changing (i.e. a conversion event is occurring). When a conversion event is occurring, the sensor logic 201 asserts a signal (e.g., general-purpose input-output or GPIO signal). This signal is received by the embedded controller 301, which controls one or more input devices such as the power button, volume buttons, and keyboard. This signal is also received by the touch panel controller 305 and touch pad controller 306. All of these devices, when they receive the signal, temporarily mask all inputs. The sensor logic 201 will stop asserting the signal after a short amount of time (e.g. 100 milliseconds or ms) passes with no further changes detected to the angle between the lid and the base. When the signal is deasserted, the embedded controller 301, touch panel controller 305, touch pad controller 306, and any other devices stop masking input and resume their normal operations.

Referring back to FIG. 3, sensor logic 201 further includes orientation detector 303 to process magnetic data obtained from magnetometers 203 and to determine an orientation of the mobile device. Based on the magnetic data collected from magnetometers 203 and the movement data collected from accelerometers 202, sensor logic 201 can determine which of the operating modes (e.g., clamshell, tablet, tent, and stand modes) in which the mobile device is operating. Further configuration may also be adjusted based on the detected operating mode.

Figure 5:
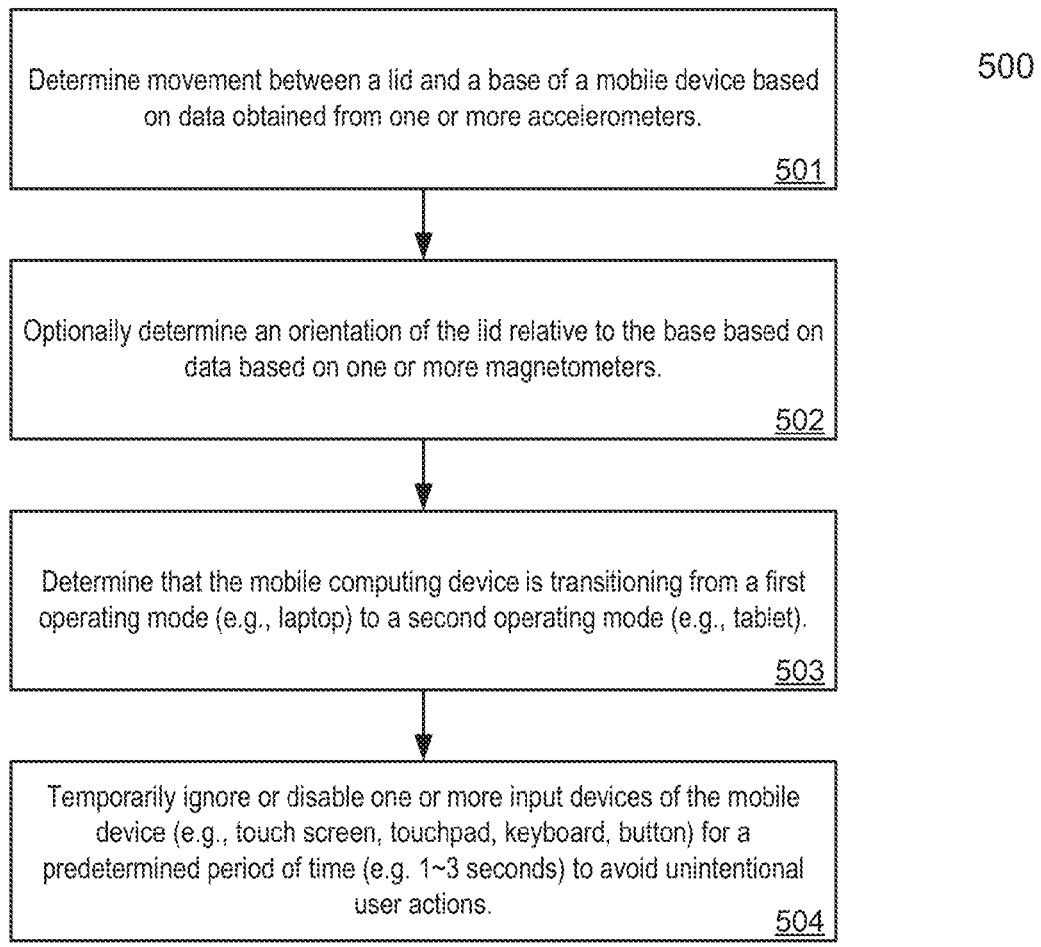
FIG. 5 is a flow diagram illustrating a method for operating a mobile device according to one embodiment.

FIG. 5 is a flow diagram illustrating a method for operating a mobile device according to one embodiment. Method 500 may be performed by processing logic which may include software, hardware, or a combination thereof. For example, method 500 may be performed by sensor logic 201 and/or embedded controller 301. Referring to FIG. 5, at block 501, processing logic determines movement between a lid/display panel and a base of a mobile device based on movement data obtained from one or more accelerometers disposed in the mobile device. At block 502, processing logic optionally determines an orientation of the lid relative to the base based on magnetic data obtained from one or more magnetometers disposed within the mobile device. At block 503, processing logic determines that the mobile device is transitioning from a first operating mode (e.g., clamshell mode) to a second operating mode (e.g., tablet mode) based on the movement data and/or magnetic data. At block 504, processing logic temporarily disables or ignores one or more input devices or interfaces of the mobile device (e.g., touch screen, touchpad, keyboard, other buttons) for a predetermined period of time to avoid any unintentional user action. In one embodiment, the predetermined period of time may be ranging from approximately 1 to 3 seconds, which may be user or administrator configurable and stored in a persistent storage area of the mobile device (e.g., hard drive or read-only memory such as BIOS).

As described above, some mobile devices such as 360 degree hinge two-in-one Ultrabook designs may be configured as a traditional clamshell notebook, as a tablet device, standing on a table with the hinge up in tent mode, or with the hinge flat in stand mode. It is better for the system to know the angle of the lid with respect to the base in order to enable or disable platform features. For example, when in tablet, tent, stand, or lid closed modes, the keyboard and touchpad may be disabled. The screen may be turned off and power saving features enabled when the lid is closed. According to one embodiment, when the lid and base are coplanar in either tablet mode or lid closed mode, a magnetometer provides confirmation of the lid state.

Accelerometers can measure the angle of a surface with respect to gravity in three dimensions. An Ultrabook with two accelerometers can use the difference in angle with respect to gravity between the lid and the base to calculate the angle between the two surfaces. A magnetometer (e.g., a first magnetometer) in one surface placed opposite another magnetometer (e.g., a second magnetometer) on the opposing surface may be used to sense the orientation of that surface. For example, when the lid is closed, the magnetic field may be strongly positive, and when the lid is open, the magnetic field may be strongly negative. The magnetic field strength observed on one or more axes may be strongly positive or negative. The information from the accelerometer(s) and magnetometer(s) may be combined with other physical or fusion sensors in the sensor solution to calculate an accurate representation of the platform's position in space and position of its surfaces. Such information may also be communicated to an operating system (OS) in a form of events such as lid closure and opening events, which in turn cause the system to operate in a different manner such as enter standby or exit standby.

According to one embodiment, the mobile device includes at least one magnetometer to differentiate lid closed and tablet states. Because the lid angle calculation is running in a sensor logic (e.g., a microcontroller), it can run continuously in connected standby and maintain state about the lid angle even when the system is in a low power state. Constant awareness of platform configuration results in a better user experience, since the system behaves as expected even if the surfaces are moved while the platform is in a low power state. Since the sensor logic is aware of the platform power state, it may save power by disabling the lid sensing magnetometer unless the lid is near the lid closed or tablet positions. The sensor logic may also save power by disabling the second accelerometer unless motion is detected on the primary accelerometer. In one embodiment, based on movement data provided by the accelerometer(s) and magnetic data provided by the magnetometer (s), the operating mode (e.g., clamshell, tablet, tent, and stand modes) of the mobile device can be determined, as shown in FIG. 6, and based on the operating mode of the mobile device, the operating system can configure or adjust the operating environment that is suitable for that particular operating mode.

In a typical clamshell system, pressing any key on the keyboard results in a GPIO changing state on the platform controller hub (PCH). The PCH controls certain data paths and support functions used in conjunction with processors or CPUs. These include clocking (the system clock), Flexible Display Interface (FDI) and Direct Media Interface (DMI), although FDI is only used when the chipset is required to support a processor with integrated graphics. As such, I/O Functions are reassigned between this new central hub and the processor compared to the previous architecture: some Northbridge functions, the memory controller and PCI-e lanes, were integrated into the CPU while the PCH took over the remaining functions in addition to the traditional roles of the Southbridge. Typically, the PCH will have been configured by the operating system to wake the system when this occurs. The GPIO in question is often driven by the embedded controller, which is the device that actually detects keypresses. In a 360° hinge system, the keyboard should only cause a potential system wake (assuming the system is configured to do so) when in clamshell state. This requires the platform to be able to differentiate clamshell state versus closed, tent, or tablet mode while in different power states. The EC is assumed to be able to detect clamshell versus other states, and forward a button pressed indication.

In order to determine if the system is in a clamshell state or not, the EC relies on an input GPIO from the sensor logic. This GPIO is referred to as the TABLET_MODE GPIO. The sensor logic uses two accelerometers, one in the lid, one in the base, and measures the difference in gravity vector reading between them to determine the angle (0-360°) between them. When the angle is >180°, the sensor logic sets the state of the TABLET_MODE GPIO to active (high). When the angle is ≤180°, the sensor logic sets the state of the TABLET_MODE GPIO to inactive (low).

Note that there is a corner condition that must be handled—the 0° and 360° states are indistinguishable just using accelerometers. As such, a magnetometer is used to differentiate between these two states. A magnet (or magnetic object such as a speaker) is placed in the opposite surface of the system. When the accelerometers indicate a lid to base angle close to 0° or 360°, a magnetometer in the base of the system is used to detect the relative polarity of the magnet. The polarity of the magnet indicates whether the system is closed (0°) or in tablet configuration (360°). The sensor logic uses the combination of the lid angle and the magnetometer state to trigger a GPIO called LID_OPEN_GPIO.

In a typical clamshell system, closing or opening the LID results in a GPIO changing state on the PCH. Typically, the PCH will have been configured by the OS to notify the system when this occurs (potentially waking it on a lid open indication). The GPIO in question may be driven directly or indirectly (e.g. via EC) by a hall-effect switch. Typically the hall-effect switch will be located in the base, with a magnet in the lid oriented such that when the lid closes or opens, the hall-effect switch changes state. The hall-effect switch may also be placed in the lid, although this requires an additional wire between the lid and the base, which is undesirable.

In a 360° hinge system, a Hall-effect switch would be unable to differentiate between closing/opening the lid and entering/exiting tablet mode. This is due to the fact that in both scenarios, the magnet in the lid is brought into or taken out of close proximity from the Hall effect switch. Instead of a hall-effect switch, the sensor logic is used in a 360° hinge system to detect lid-closed/lid-open. The sensor logic uses accelerometers in the lid and base to determine if the system is entering/exiting the lid closed or tablet mode state, then uses a magnetometer plus magnet of known polarity to differentiate between a lid closed/open transition and a tablet entry/exit transition. Based on this information, the sensor logic changes the state of a GPIO signal to the PCH to indicate lid-closed or lid-open events.

Figure 7:
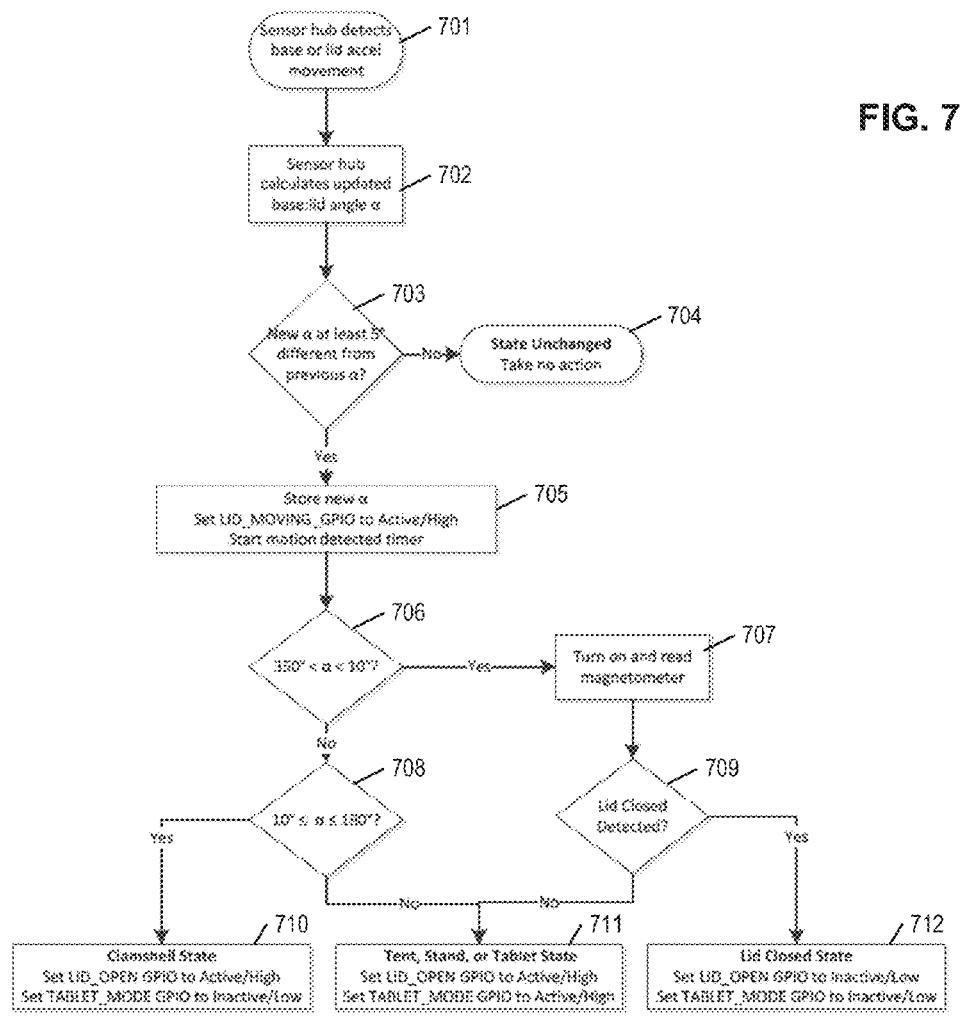
FIG. 7 is a flow diagram illustrating a method for determining an operating mode of a mobile device according one embodiment.

FIG. 7 is a flow diagram illustrating a method for determining an operating mode of a mobile device according one embodiment. Method 700 may be performed by processing logic which may include software, hardware, or a combination thereof. For example, method 700 may be performed by sensor logic 201 and/or embedded controller 301. Referring to FIG. 7, at block 701, sensor logic detects the movement between a lid and a base of a mobile device. At block 702, sensor logic calculates and updates an angle between the lid and the base. At block 703, sensor logic determines whether the change of the angle from a previous angle is greater than five degrees. If not, at block 704, no action is needed; otherwise at block 705, the new angle is stored and a signal is asserted and a timer is activated. At block 706, it is determined whether the change of angle is greater than −10 degrees (e.g., 350 degrees) and less than 10 degrees. If so, at block 707, a magnetometer is read to determine whether the lid is closed at block 709. If so, the mobile device is operating in a clamshell close mode at block 712; otherwise, the mobile device is operating in a tent, stand, or a tablet mode at block 711.

If the angle is not in the range between −10 degrees and 10 degrees, it is determined whether the angle is greater than 10 degrees and less than 180 degrees at block 708. If so, at block 710, the mobile device is operating in a clamshell open mode. Otherwise at block 711, the mobile device is operating in a tent, stand, or a tablet mode at block 711.

In one embodiment, a mobile device includes a base unit having a processor and memory disposed therein, the base unit having a first accelerometer embedded therein; a display panel attached to the base unit, the display panel capable of rotatably moving relative to the base unit to enable the mobile device to operate in a plurality of operating modes, the display panel having a second accelerometer embedded therein; and a controller configured to process motion data collected from the first and second accelerometers to determine whether the display panel moves relative to the base unit and to temporarily ignore or disable one or more input devices of the mobile device for a predetermined period of time to avoid unintentional user interaction with the mobile device during the movement of the display panel. The controller is configured to determine an angle between a surface of the display panel and a surface of the base unit, and to determine whether the display panel moves relative to the base unit based on a change of the angle. The mobile device further includes a first magnetometer disposed in the base unit; and a second magnetometer disposed in the display panel, wherein the controller is configured to determine an orientation of the display panel relative to the base unit based on magnetic data collected from the first and second magnetometers. The controller is to determine whether the mobile device operates in one of a clamshell mode, a tablet mode, a tent mode, and a stand mode based on a strength and/or a polarity of a magnetic field detected by the first and second magnetometers. The controller is configured to transmit a signal indicating a current operating mode of the mobile device based on the magnet data to an operating system executed by the processor to allow the operating system to adjust an operating environment of the mobile device that is suitable for the determined operating mode of the mobile device. The mobile device further includes a touch panel controller coupled to the controller, wherein during the movement of the display panel relative to the base unit, the controller is configured to instruct the touch panel controller to ignore any input received from a touch screen of the display panel. The mobile device further includes a touchpad and a touchpad controller coupled to the controller, wherein during the movement of the display panel relative to the base unit, the controller is configured to instruct the touchpad controller to ignore any input received from the touchpad. The mobile device further includes a keyboard and a keyboard controller coupled to the controller, wherein during the movement of the display panel relative to the base unit, the controller is configured to instruct the keyboard controller to ignore any keystroke received from the keyboard.

Figure 8:
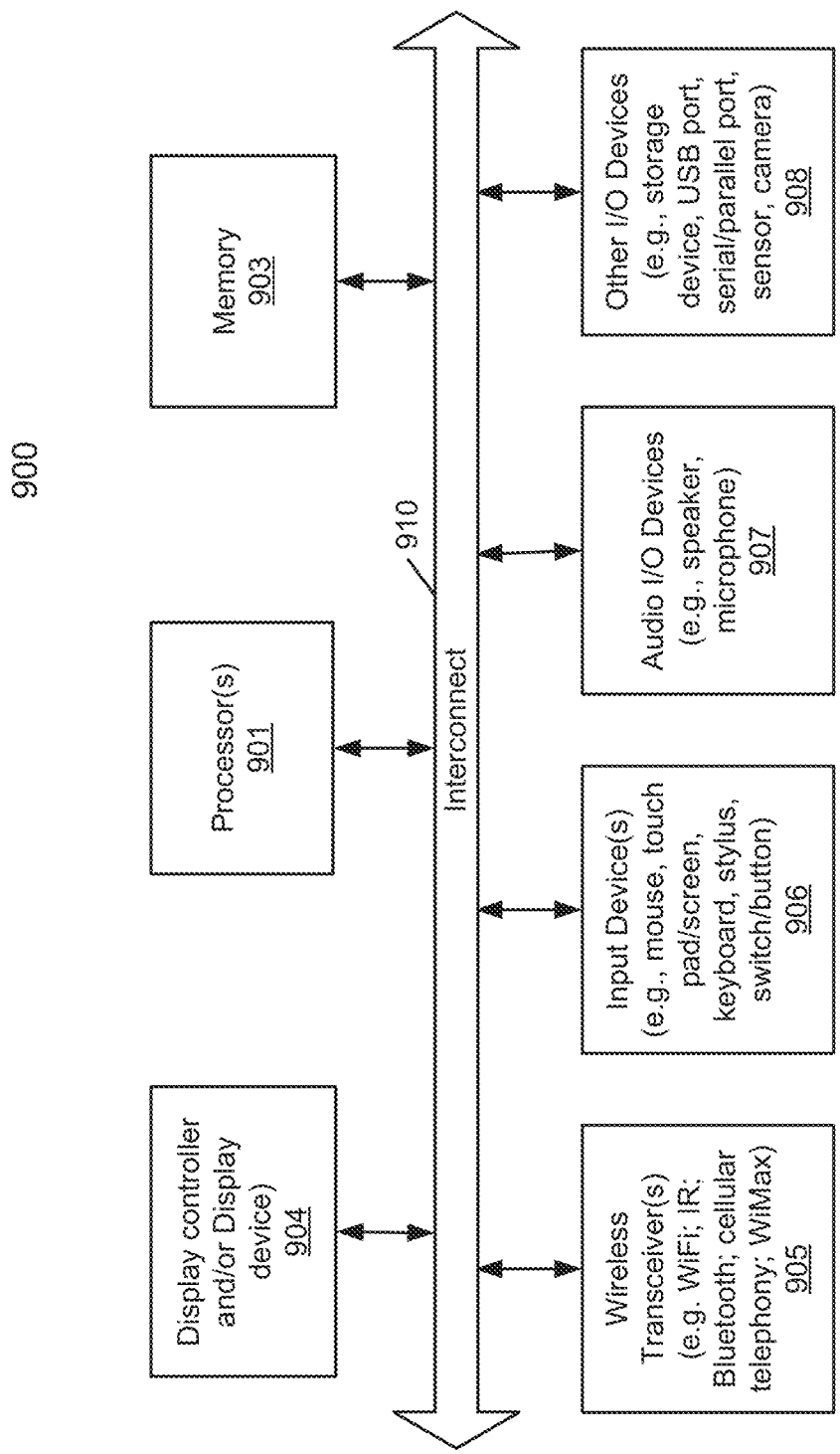
FIG. 8 is a block diagram illustrating a mobile device according to one embodiment.

FIG. 8 is a block diagram illustrating an example of a data processing system which may be used with one embodiment of the invention. For example, system 900 may represents any of data processing systems described above performing any of the processes or methods described above. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra low voltage processor, may act as a main processing unit and central hub for communication with the various components of the system. Such processor can be implemented as a system on chip (SoC). In one embodiment, processor 901 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 901 is configured to execute instructions for performing the operations and steps discussed herein. System 900 further includes a graphics interface that communicates with graphics subsystem 904, which may include a display controller and/or a display device.

Processor 901 may communicate with memory 903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 810 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 900 may further include IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor logic (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A mobile system, comprising:
   a base unit having a processor and memory disposed therein, the base unit having a first accelerometer embedded therein;
   a display panel attached to the base unit, the display panel capable of rotatably moving relative to the base unit to enable the mobile system to operate in a plurality of operating modes, the display panel having a second accelerometer embedded therein; and
   control logic, at least a portion of which is implemented in hardware, to process motion data collected from the first and second accelerometers to determine whether the display panel moves relative to the base unit and to temporarily ignore or disable one or more input devices of the mobile system for a predetermined period of time to avoid unintentional user interaction with the mobile system during the movement of the display panel;
a first magnetometer disposed in the base unit; and
a second magnetometer disposed in the display panel, wherein the control logic is configured to determine an orientation of the display panel relative to the base unit based on magnetic data collected from the first and second magnetometers.

2. The mobile system of claim 1, wherein the control logic is configured to determine an angle between a surface of the display panel and a surface of the base unit, and to determine whether the display panel moves relative to the base unit based on a change of the angle.

3. The mobile system of claim 1, wherein the control logic is to determine whether the mobile system operates in one of a clamshell mode, a tablet mode, a tent mode, and a stand mode based on a strength and/or a polarity of a magnetic field detected by the first and second magnetometers.

4. The mobile system of claim 3, wherein the control logic is configured to transmit a signal indicating a current operating mode of the mobile system based on the magnet data to an operating system executed by the processor to allow the operating system to adjust an operating environment of the mobile system that is suitable for the determined operating mode of the mobile system.

5. The mobile system of claim 1, further comprising a touch panel controller coupled to the control logic, wherein during the movement of the display panel relative to the base unit, the control logic is configured to instruct the touch panel controller to ignore any input received from a touch screen of the display panel.

6. The mobile system of claim 1, further comprising a touchpad and a touchpad controller coupled to the control logic, wherein during the movement of the display panel relative to the base unit, the control logic is configured to instruct the touchpad controller to ignore any input received from the touchpad.

7. The mobile system of claim 1, further comprising a keyboard and a keyboard controller coupled to the control logic, wherein during the movement of the display panel relative to the base unit, the control logic is configured to instruct the keyboard controller to ignore any keystroke received from the keyboard.

8. A non-transitory computer-readable medium having stored thereon data representing sequences of instructions that, when executed by a processor, cause the processor to perform operations, the operations comprising:
collecting, by a control logic, at least a portion of which is implemented in hardware, of a mobile device disposed therein, movement data from a first accelerometer disposed in a base unit of the mobile device and a second accelerometer disposed in a display panel of the mobile device, the display panel capable of rotatably moving relative to the base unit to enable the mobile device to operate in a plurality of operating modes;
determining, by the control logic, whether the display panel moves relative to the base unit based on the motion data collected from the first and second accelerometers;
determining an orientation of the display panel relative to the base unit based on magnetic data collected from a first magnetometer disposed in the base unit and a second magnetometer disposed in the display panel; and
temporarily ignoring or disabling one or more input devices of the mobile device for a predetermined period of time to avoid unintentional user interaction with the mobile device during the movement of the display panel.

9. The non-transitory computer-readable medium of claim 8, wherein determine whether the display panel moves relative to the base unit comprises determining an angle between a surface of the display panel and a surface of the base unit.

10. The non-transitory computer-readable medium of claim 8, wherein the operations further comprise determining whether the mobile device operates in one of a clamshell mode, a tablet mode, a tent mode, and a stand mode based on a strength and/or a polarity of a magnetic field detected by the first and second magnetometers.

11. The non-transitory computer-readable medium of claim 10, wherein the operations further comprise transmitting a signal indicating a current operating mode of the mobile device based on the magnet data to an operating system executed by the processor to allow the operating system to adjust an operating environment of the mobile device that is suitable for the determined operating mode of the mobile device.

12. The non-transitory computer-readable medium of claim 8, wherein the operations further comprise ignoring any input received from a touch screen of the display panel during the movement.

13. The non-transitory computer-readable medium of claim 8, wherein the operations further comprise ignoring any input received from a touchpad of the mobile device during the movement.

14. The non-transitory computer-readable medium of claim 8, wherein the operations further comprise ignoring any keystroke received from a keyboard of the mobile device during the movement.

15. A device, comprising:
control logic, at least a portion of which is implemented in hardware, to process motion data, the motion data collected from a first accelerometer in a base unit and from a second accelerometer in a display panel attached to a base unit of a mobile device, to determine whether the display panel moves relative to the base unit and to temporarily ignore or disable one or more input devices of the mobile device for a predetermined period of time to avoid unintentional user interaction with the mobile device during the movement of the display panel, wherein the control logic is configured to determine an orientation of the display panel relative to the base unit based on magnetic data collected from a first magnetometer disposed in the base unit and a second magnetometer disposed in the display panel.

16. The device of claim 15, wherein determine whether the display panel moves relative to the base unit comprises determining an angle between a surface of the display panel and a surface of the base unit.

17. The device of claim 15, wherein the control logic is configured to determine whether the mobile device operates in one of a clamshell mode, a tablet mode, a tent mode, and a stand mode based on a strength and/or a polarity of a magnetic field detected by the first and second magnetometers.

18. The device of claim 17, wherein the control logic is configured to transmit a signal indicating a current operating mode of the mobile device based on the magnet data to an operating system executed by the processor to allow the operating system to adjust an operating environment of the mobile device that is suitable for the determined operating mode of the mobile device.

19. The device of claim 15, wherein the control logic is configured to ignore any input received from a touch screen of the display panel during the movement.

20. The device of claim 15, wherein the control logic is configured to ignore any input received from a touchpad of the mobile device during the movement.

21. The device of claim 15, wherein the control logic is configured to ignore any keystroke received from a keyboard of the mobile device during the movement.

* * * * *